(12) United States Patent
Maskatia et al.

(10) Patent No.: US 6,980,420 B2
(45) Date of Patent: Dec. 27, 2005

(54) PORTABLE ELECTRONIC DEVICE WITH A DOCKING UNIT

(75) Inventors: Arif Maskatia, San Jose, CA (US);
Stephen Cheung, San Jose, CA (US);
Erich Elkins, San Jose, CA (US);
Christopher Fruhauf, San Jose, CA (US)

(73) Assignee: Acer Inc., Taipei Hsien (TW)

( * ) Notice: Subject to any disclaimer, the term of this patent is extended or adjusted under 35 U.S.C. 154(b) by 162 days.

(21) Appl. No.: 10/456,536

(22) Filed: Jun. 9, 2003

(65) Prior Publication Data

US 2004/0246666 A1 Dec. 9, 2004

(51) Int. Cl.⁷ .................................................. G06F 1/16
(52) U.S. Cl. ...................... 361/683; 361/686; 345/179; 248/917
(58) Field of Search ................................ 361/680–686; 345/179, 905, 168, 169; 248/917–920

(56) References Cited

U.S. PATENT DOCUMENTS

| | | | | |
|---|---|---|---|---|
| 4,978,949 A | * | 12/1990 | Herron et al. | 345/168 |
| 5,144,290 A | * | 9/1992 | Honda et al. | 345/156 |
| 5,355,279 A | * | 10/1994 | Lee et al. | 361/681 |
| 5,548,478 A | * | 8/1996 | Kumar et al. | 361/681 |
| 6,028,764 A | * | 2/2000 | Richardson et al. | 361/681 |
| 6,282,082 B1 | * | 8/2001 | Armitage et al. | 361/681 |
| 6,687,119 B2 | * | 2/2004 | Lai et al. | 361/683 |
| 6,700,775 B1 | * | 3/2004 | Chuang et al. | 361/680 |
| 6,781,819 B2 | * | 8/2004 | Yang et al. | 361/680 |
| 6,788,527 B2 | * | 9/2004 | Doczy et al. | 361/680 |
| 2002/0186202 A1 | | 12/2002 | Huang | |
| 2004/0012575 A1 | * | 1/2004 | Homer et al. | 345/179 |

\* cited by examiner

*Primary Examiner*—Lisa Lea-Edmonds
(74) *Attorney, Agent, or Firm*—Michael Bednarek; Pillsbury Winthrop Shaw Pittman LLP (57) ABSTRACT

A portable electronic device includes an expansion base module, a hinge mechanism mounted slidably on the expansion base module and slidable relative to the expansion base module, a docking unit pivoted to the hinge mechanism, defining a docking groove, and including a docking connector, and a system module including a panel having two opposite sides that respectively have two opposing end portions inserted into and detachably retained in the docking groove. The system module further includes a system connector that is mounted on the panel and that mates with the docking connector.

4 Claims, 9 Drawing Sheets

PORTABLE ELECTRONIC DEVICE WITH A DOCKING UNIT

BACKGROUND OF THE INVENTION

1. Field of the Invention

This invention relates to a portable electronic device with a docking unit and a hinge mechanism that facilitates installation and sliding movement of a system module on an expansion base module.

2. Description of the Related Art

Figure 1:
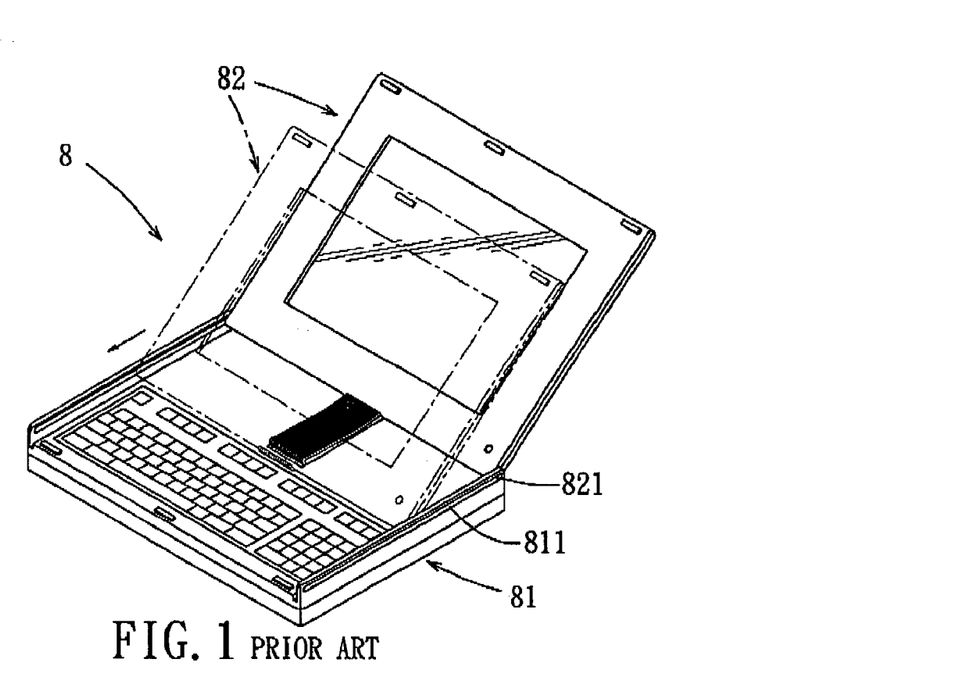
FIG. 1 is a perspective view of a conventional portable computer with a display panel being slidable relative to a base module.

FIG. 1 illustrates a conventional portable computer disclosed in U.S. Pat. No. 5,548,478. The portable computer 8 includes a base module 81 formed with a pair of opposite rail grooves 811, and a display panel 82 that is mounted pivotally and slidably on the base module 81 through a pair of pins 821 that respectively extend into the rail grooves 811. The display module 82 is pivotable relative to the base module 81 so as to overlay on the base module 81 when the display module 82 is slid to a front end of the base module 81. As such, the portable computer can serve as a tablet computer. Moreover, the display module 82 can be slid to a desired position relative to the base module 81 according to the preference of the user. The aforesaid portable computer 8 is disadvantageous in that detachment of the display panel 82 from the base module 81 is relatively difficult and inconvenient.

Figure 2:
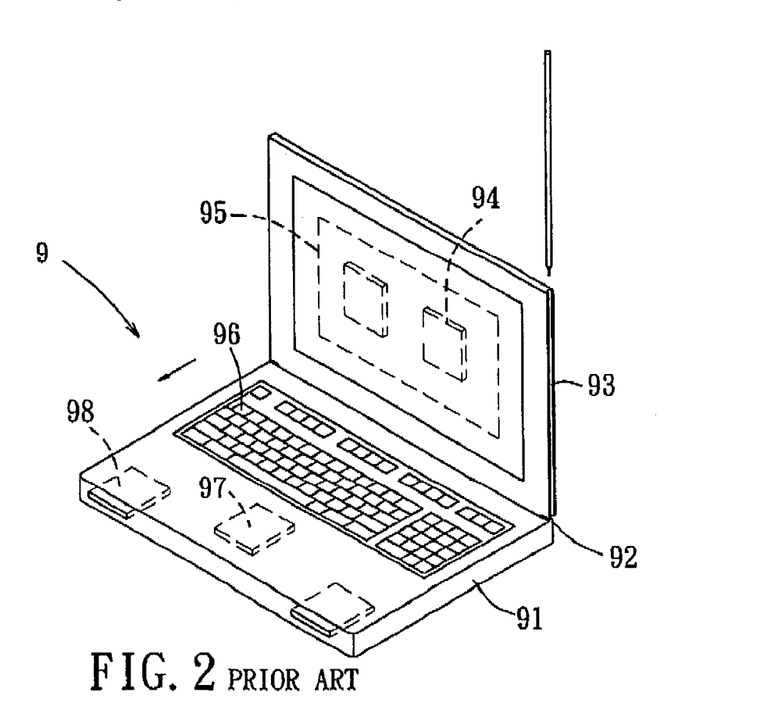
FIG. 2 is a perspective view of another conventional portable computer with a slate computer pivoted to an expansion base module.

FIG. 2 illustrates another conventional portable computer 9 disclosed in U.S. Published Application No. 2002/0,186,202. The portable computer includes an expansion base module 91, and a system module 93, such as a slate computer, that is detachably pivoted to the expansion base module 91 through a connecting member 92. The system module 93 further includes a mother board 95 and a CPU 94. The expansion base module 91 includes a keyboard 96, and expansion devices, such as an expansion hard disc 97 and a CD-ROM 98. The aforesaid conventional portable computer 9 is disadvantageous in that the slate computer 93 is not slidable relative to the expansion base module 91.

The whole disclosures of U.S. Pat. No. 5,548,478 and U.S. Published Application No. 2002/0,186,202 are incorporated herein by reference.

SUMMARY OF THE INVENTION

Therefore, the object of the present invention is to provide a portable electronic device that is capable of overcoming the aforesaid drawbacks of the prior art.

According to the present invention, there is provided a portable electronic device that comprises: an expansion base module having front and rear ends and two opposite sides that extend between the front and rear ends in a longitudinal direction; a hinge mechanism mounted slidably on the expansion base module and slidable relative to the expansion base module in the longitudinal direction between the front and rear ends of the expansion base module; a docking unit pivoted to the hinge mechanism and defining a docking groove, the docking unit including a docking connector; and a system module including a panel having two opposite sides that respectively have two opposing end portions inserted into and detachably retained in the docking groove. The system module further includes a system connector that is mounted on the panel and that mates with the docking connector.

BRIEF DESCRIPTION OF THE DRAWINGS

In drawings which illustrate embodiments of the invention.

DETAILED DESCRIPTION OF THE PREFERRED EMBODIMENTS

For the sake of brevity, like elements are denoted by the same reference numerals throughout the disclosure.

This invention relates to a portable electronic device, such as a portable computer, a palm PC, a pocket PC, or a cellular phone. FIGS. 3 to 6 illustrate the preferred embodiment of a portable computer 1 according to the present invention. The portable computer 1 combines an expansion base module 2 and a system module 3, such as a liquid crystal display (LCD) panel, a touch input panel, or a slate computer (which normally includes a mother board, a CPU, a memory Unit, a display panel, a hard disc, a battery unit, and electronic components which allow the computer slate to function as a portable computer).

Figure 3:
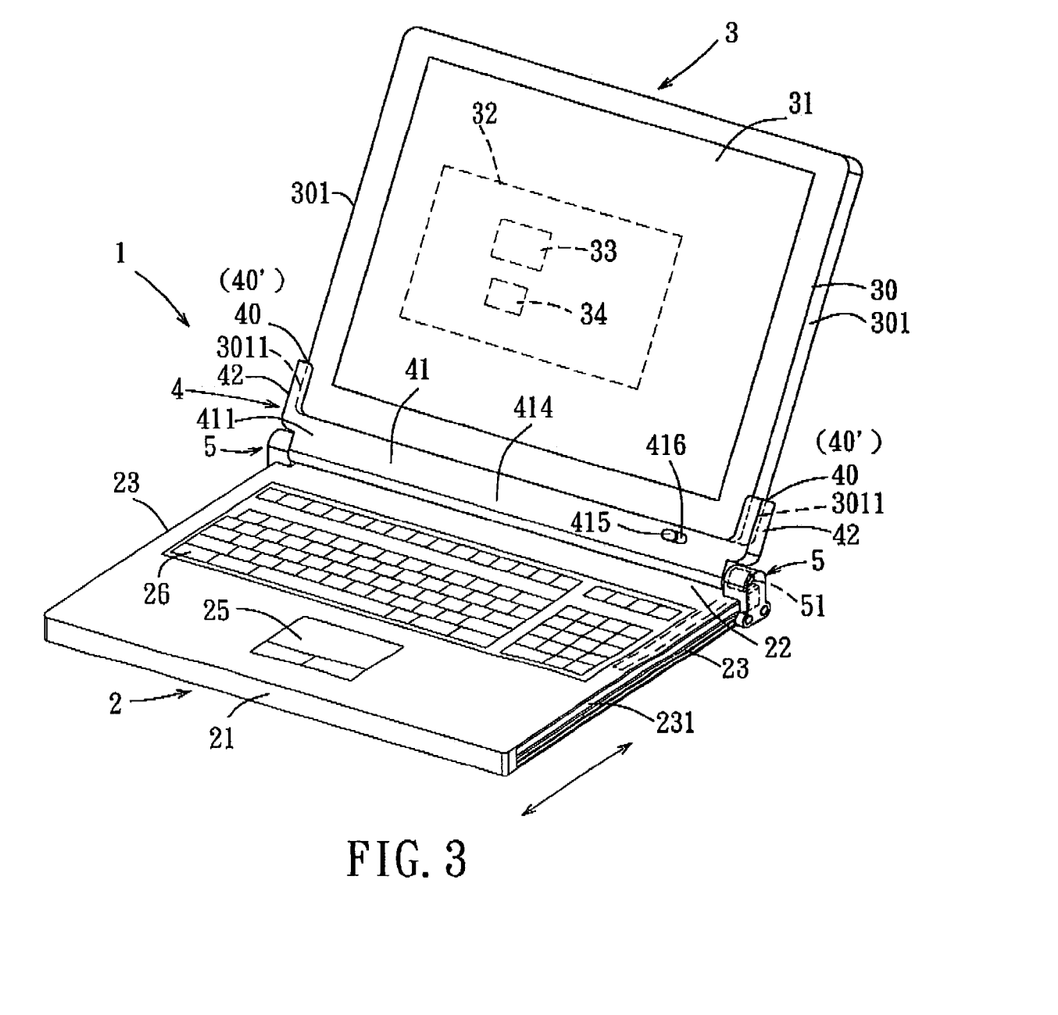
FIG. 3 is a perspective view of the first preferred embodiment of a portable computer according to this invention.
Figure 4:
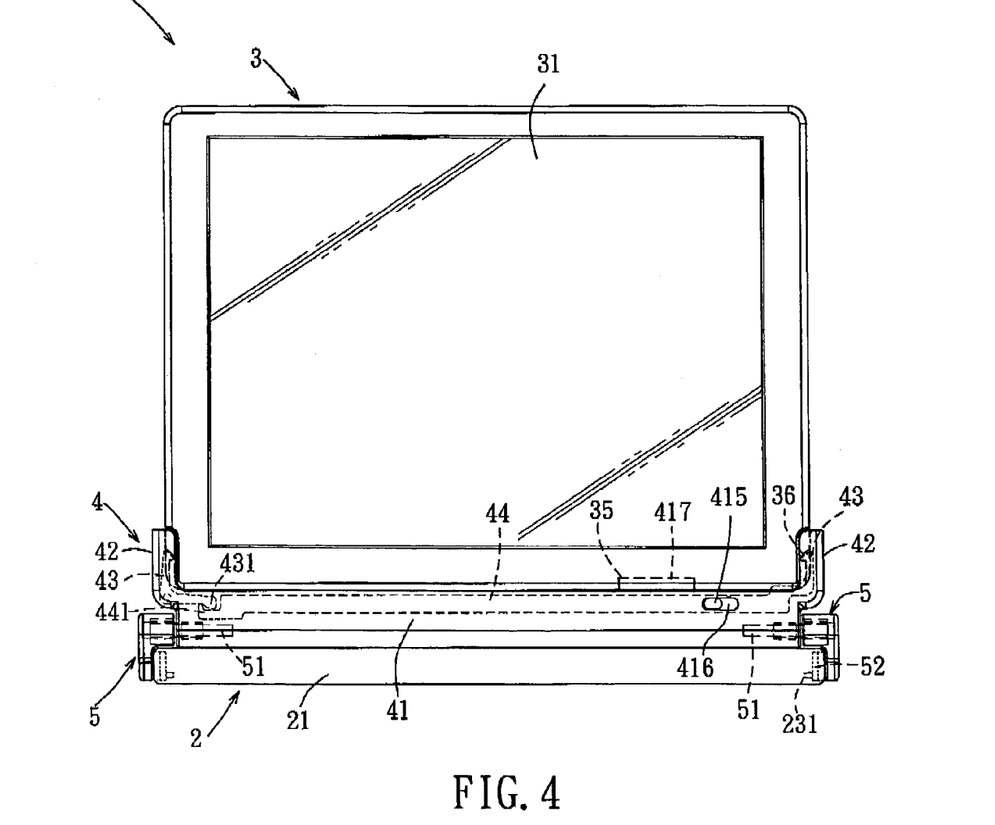
FIG. 4 is a front view to illustrate how a system module is installed on an expansion base module of the portable computer of FIG. 3 through a docking unit.
Figure 5:
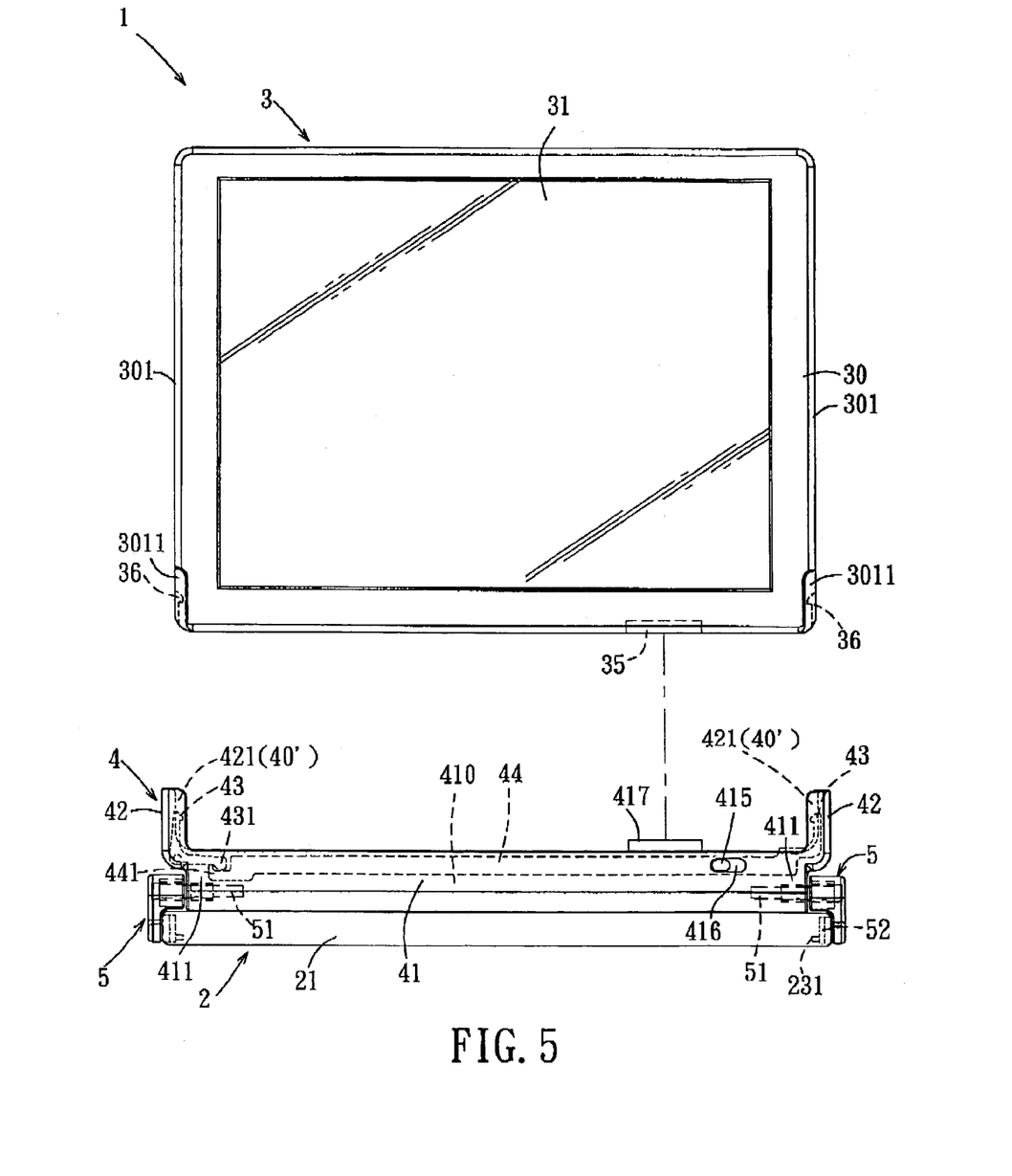
FIG. 5 is a front view to illustrate how the system module is detached from the expansion base module of the portable computer of FIG. 3.

The expansion base module 2 has front and rear ends 21, 22 and two opposite sides 23 that extend between the front and rear ends 21, 22 in a longitudinal direction. Each sides 23 is formed with a rail groove 231 extending in the longitudinal direction from the rear end 21 to the front end 22 of the expansion base module 2.

A hinge mechanism 5 is mounted slidably on the expansion base module 2, and is slidable relative to the expansion base module 2 in the longitudinal direction between the front and rear ends 21, 22 of the expansion base module 2. The hinge mechanism 5 includes a pair of pivot shafts 51 that are disposed above the expansion base module 2 and that extend in a transverse direction relative to the longitudinal direction, and a pair of rail guides 52 that respectively project into the rail grooves 231 in the opposite sides 23 of the expansion base module 2.

A docking unit 4 is pivoted to the hinge mechanism 5 through the pivot shafts 51 so as to be pivotable about the pivot shafts 51 and so as to be co-slidable with the hinge mechanism 5. The docking unit 4 defines a docking groove (40'), and includes a docking connector 417.

Figure 6:
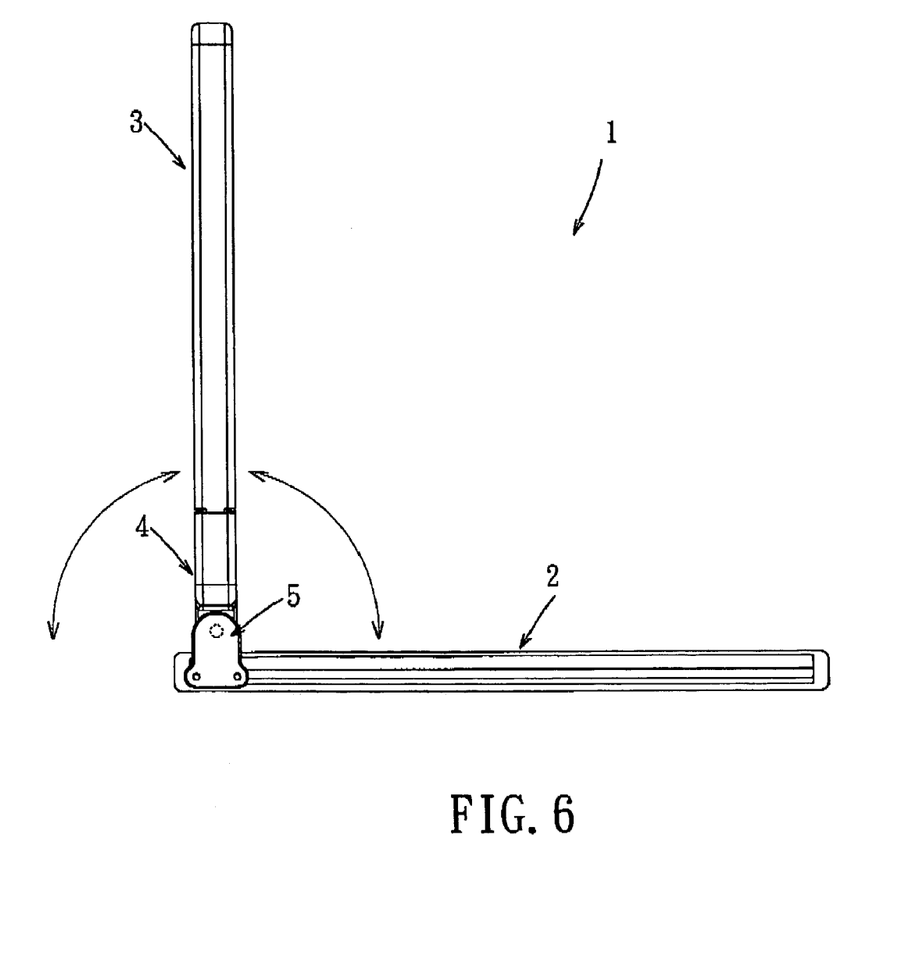
FIG. 6 is a side view to illustrate how the system module pivots relative to the expansion base module of the portable computer of FIG. 3.

The system module 3 includes a panel 30 having two opposite sides 301 that respectively have two opposing end portions 3011 inserted into and detachably retained in the docking groove 40' so as to be slidable and pivotable relative to the expansion base module 2 as best shown in FIG. 6. The system module 3 further includes a system connector 35 that is mounted on a bottom end of the panel 30 and that mates with the docking connector 417.

In the preferred embodiment, the docking unit 4 includes a crossbar 41 that extends between the opposite sides 23 of the expansion base module 2 in the transverse direction. The crossbar 41 has two opposite ends 411 that are respectively disposed adjacent to the opposite sides 23 of the expansion base module 2. The docking unit 4 further includes a pair of side arms 42 that extend transversely and respectively from the opposite ends 411 of the crossbar 41 and that respectively define two opposite retaining grooves 421 which open toward the system module 3 and which cooperatively define the docking groove 40'.

The end portions 3011 of the opposite sides 301 of the panel 30 are respectively formed with two opposing locking holes 36 that are respectively disposed within the retaining grooves 421. The portable electronic device further includes a lock unit that includes a pair of latches 43 which respectively extend in the retaining grooves 421 and which are operable to move between a locking position (see FIG. 4), in which the latches 43 respectively and releasably engage the locking holes 36, and a unlocking position, in which the latches 43 respectively disengage from the locking holes 36.

The crossbar 41 is hollow, and defines an inner space 410 therein. The crossbar 41 has a front wall 414 (see FIG. 3) that is formed with an elongated slot 416 which extends in the transverse direction and which is in spatial communication with the inner space 414. The locking unit further includes an operating lever 44 that is mounted movably in the inner space 410 and that is connected to the latches 43, and a knob 415 that protrudes outwardly of the inner space 410 from the operating lever 44 through the slot 416 so as to permit sliding movement of the operating lever 44 in the transverse direction between a first position (see FIG. 4), in which the latches 43 are disposed at the locking position, and a second position, in which one of the latches 43 is disposed at the unlocking position, thereby permitting disengagement of the other of the latches 43 from the respective locking hole 36 and detachment of the system module 3 from the docking unit 4.

The one of the latches 43 (on a left side of the drawing of FIG. 4 or 5) has a hooked end 431 that extends into the inner space 410. The operating lever 44 has a hooked end 441 that engages the hooked end 431 of the one of the latches 43. The other of the latches 43 is integrally formed with the operating lever 44.

Figure 7:
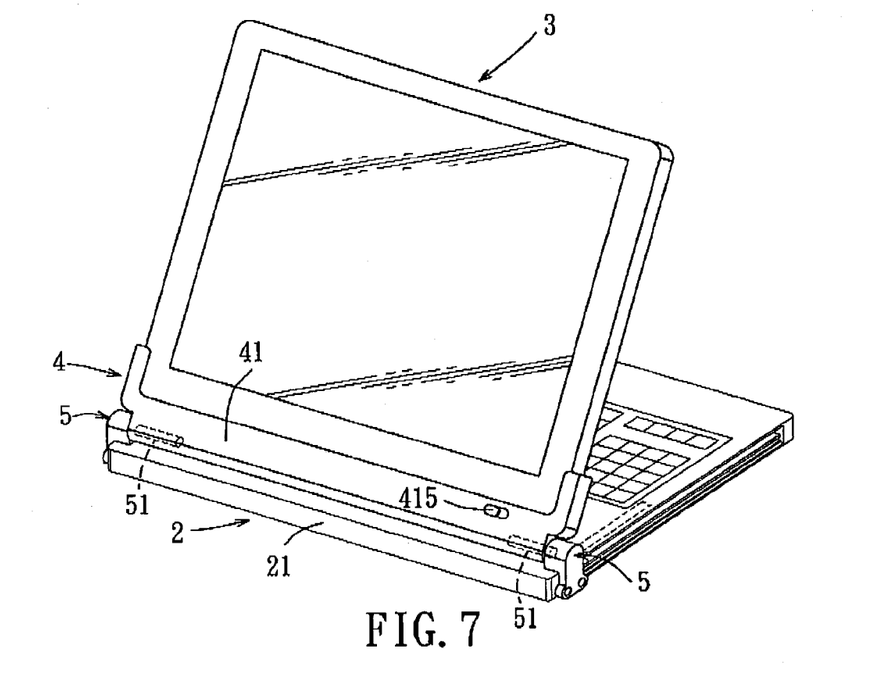
FIG. 7 is a perspective view of the portable computer of FIG. 3 with the system module slid to a front end of an expansion base module.
Figure 8:
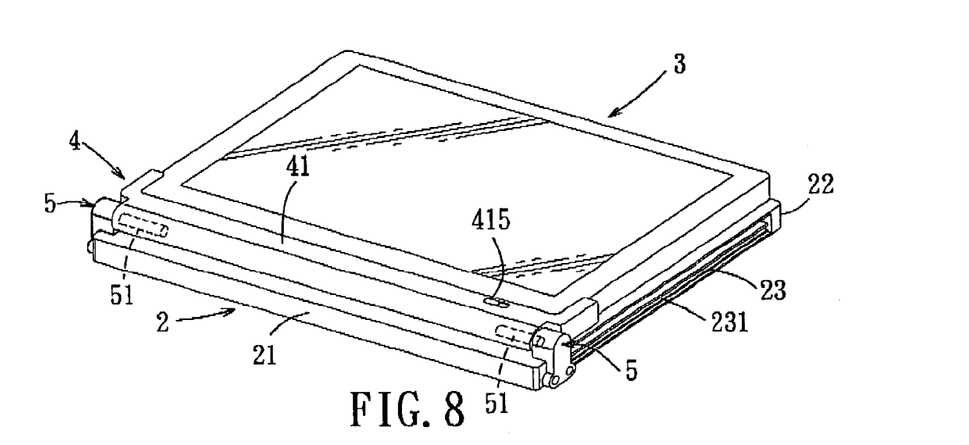
FIG. 8 is a perspective view of the portable computer of FIG. 3 with the system module pivoted to a horizontal position to overlay on the expansion base module.

With reference to FIGS. 7 and 8, the portable computer 1 of this invention can be easily converted into a tablet computer by sliding the system module 3 to the front end 21 of the expansion base module 2 and subsequently pivoting the system module 3 about the pivot shafts 51 relative to the expansion base module 2 to a horizontal position to overlay on the expansion base module 2.

Figure 9:
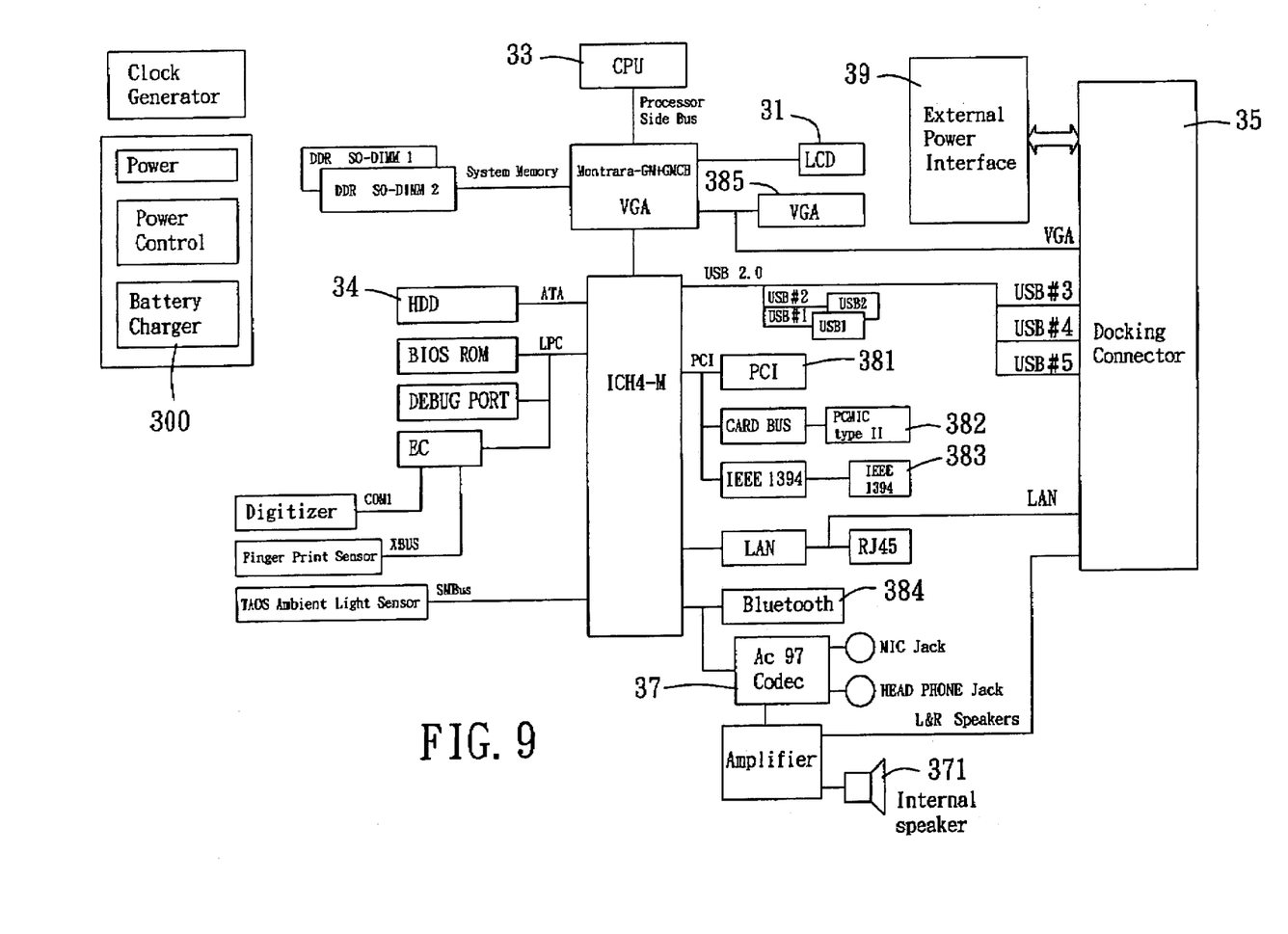
FIG. 9 is a block diagram illustrating components of the system module of the portable computer of FIG. 3.

With reference to FIGS. 3 and 9, the system module 3 may be a slate computer that includes an LCD display screen 31, a mother board 32, a CPU 33, a hard disc 34, an Audio Codec 37, a speaker 371, a PCI (Peripheral Component Interconnect) 381, a PCMIC type II memory card 382, a IEEE 1394 connector 383, a bluetooth 384, a VGA 385, an external power interface 39, a rechargeable battery 300, etc.

Figure 10:
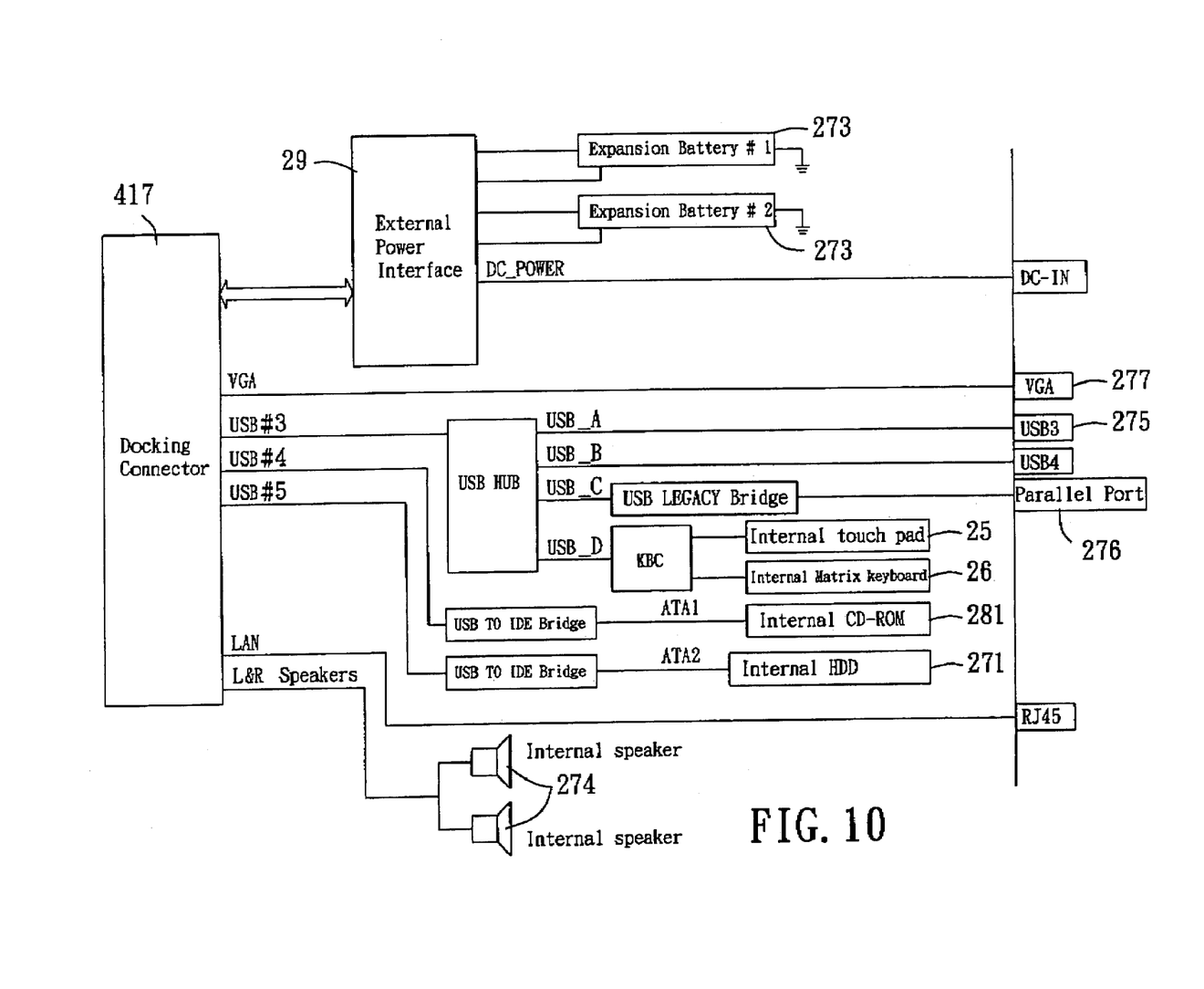
FIG. 10 is a block diagram illustrating components of the expansion base module of the portable computer of FIG. 3.

With reference to FIGS. 3 and 10, the base expansion module 2 may further include a touch pad 25, a keyboard 26, an expansion hard disc 271, expansion batteries 273, speakers 274, USE ports 275, parallel port 276, a VGA 277, an external power interface 29, and etc.

Figure 11:
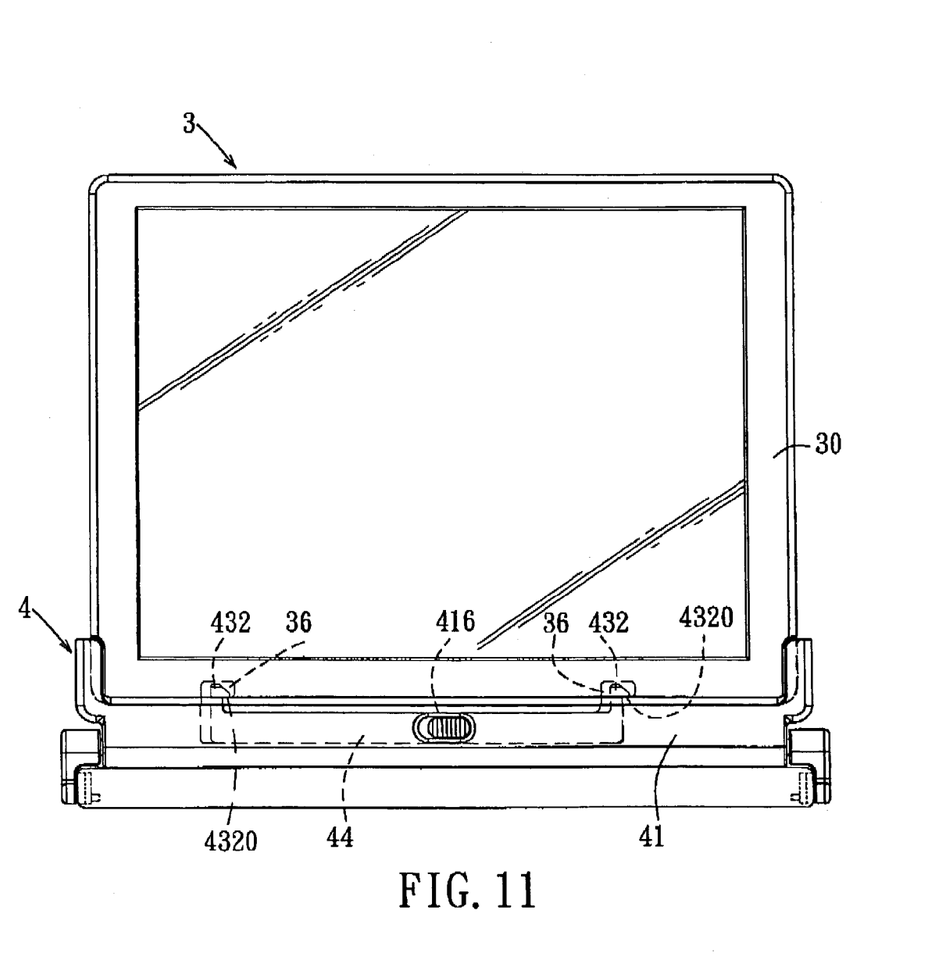
FIG. 11 is a front view of the second preferred embodiment of the portable computer according to this invention.

FIG. 11 illustrates the second preferred embodiment of the portable computer 1 which is similar to the previous embodiment, except that the locking holes 36 are formed in the bottom end of the panel 30, and that the latches 43 are integrally formed with the lever 44 and have hook ends 432 which project outwardly and upwardly from the inner space 410 in the crossbar 41, and which respectively and releasably engage the locking holes 36. The hook ends 432 of the latches 43 respectively have neck portions 4320 extending therefrom in the same direction to engage peripheries of the locking holes 36.

With the invention thus explained, it is apparent that various modifications and variations can be made without departing from the spirit of the present invention.

We claim:

1. A portable electronic device comprising:
an expansion base module having front and rear ends and two opposite sides that extend between said front and rear ends in a longitudinal direction;
a hinge mechanism mounted slidably on said expansion base module and slidable relative to said expansion base module in said longitudinal direction between said front and rear ends of said expansion base module;
a docking unit pivoted to said hinge mechanism and defining a docking groove, said docking unit including a docking connector;
a system module including a panel having two opposite sides that respectively have two opposing end portions inserted into and detachably retained in said docking groove, said system module further including a system connector that is mounted on said panel and that mates with said docking connector; and
a lock unit that includes a pair of latches;
wherein said docking unit includes a crossbar that extends between said opposite sides of said expansion base module in a transverse direction, said crossbar having two opposite ends that are respectively disposed adjacent to said opposite sides of said expansion base module, said docking unit further including a pair of side arms that extend transversely and respectively from said opposite ends of said crossbar and that respectively define two opposite retaining grooves which open toward said system module and which cooperatively define said docking groove:
wherein said end portions of said opposite sides of said panel are respectively formed with two opposing locking holes that are respectively disposed within said retaining grooves, said latches of said lock unit respectively extending in said retaining grooves and being operable to move between a locking position, in which said latches respectively and releasably engage said locking holes and an unlocking position, in which said latches respectively disengage from said locking holes; and
wherein said crossbar is hollow and defines an inner space therein, said crossbar having a front wall that is formed with an elongated slot which extends in said transverse direction and which is in spatial communication with said inner space, said lock unit further including an operating lever that is mounted movably in said inner space and that is connected to said latches, and a knob that protrudes outwardly of said inner space from said operating lever through said slot so as to permit sliding movement of said operating lever in said transverse direction between a first position, in which said latches are disposed at said locking position, and a second position, in which one of said latches is disposed at said unlocking position.

2. The portable electronic device of claim 1, wherein said one of said latches has a hooked end that extends into said inner space, said operating lever having a hooked end that engages said hooked end of said one of said latches, the other of said latches being integrally formed with said operating lever.

3. A portable electronic device comprising:

an expansion base module having front and rear ends and two opposite sides that extend between said front and rear ends in a longitudinal direction;

a hinge mechanism mounted slidably on said expansion base module and slidable relative to said expansion base module in said longitudinal direction between said front and rear ends of said expansion base module;

a docking unit pivoted to said hinge mechanism and defining a docking groove, said docking unit including a docking connector;

a system module including a panel having two opposite sides that respectively have two opposing end portions inserted into and detachably retained in said docking groove, said system module further including a system connector that is mounted on said panel and that mates with said docking connector; and a lock unit that includes a lever;

wherein said docking unit includes a crossbar that extends between said opposite sides of said expansion base module in a transverse direction said crossbar having two opposite ends that are respectively disposed adjacent to said opposite sides of said expansion base module said docking unit further including a pair of side arms that extend transversely and respectively from said opposite ends of said crossbar and that respectively define two opposite retaining grooves which open toward said system module and which cooperatively define said docking groove; and wherein said panel has a bottom end that is formed with two spaced apart locking holes, said crossbar defining an inner space therein, said lever of said lock unit being received in said inner space and being integrally formed with a pair of latches which project outwardly and upwardly from said inner space and which have hook ends respectively and releasably engaging said locking holes.

4. A portable electronic device comprising:

an expansion base module;

a docking unit mounted pivotally on said expansion base module, defining a docking groove, and including a crossbar that confines a bottom side of said docking groove, and that defines an inner space in spatial communication with said docking groove;

a system module including a panel that has a bottom end detachably retained in said docking groove and formed with two spaced apart locking holes, said panel being electrically coupled to said expansion base module; and a lock unit including a lever that is received in said inner space in said crossbar and that is formed with a pair of latches which project outwardly of said inner space and which extend into and engage releasably and respectively said locking holes in said bottom end of said panel.

* * * * *